(12) United States Patent
Koogenahalli Sadashivaiah et al.

(10) Patent No.: US 12,179,848 B2
(45) Date of Patent: Dec. 31, 2024

(54) TRUCK AND METHOD FOR TILTING THE CABIN OF SUCH A TRUCK

(71) Applicant: Volvo Truck Corporation, Gothenburg (SE)

(72) Inventors: Madhuchandra Koogenahalli Sadashivaiah, Bangalore (IN); Gangubai Hegde, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/461,571

(22) Filed: Sep. 6, 2023

(65) Prior Publication Data

US 2024/0092432 A1 Mar. 21, 2024

(30) Foreign Application Priority Data

Sep. 13, 2022 (EP) .................................... 22195404

(51) Int. Cl.
B62D 33/07 (2006.01)

(52) U.S. Cl.
CPC .................................... B62D 33/07 (2013.01)

(58) Field of Classification Search
CPC ....... B62D 25/10; B62D 33/071; B62D 33/07
See application file for complete search history.

(56) References Cited

U.S. PATENT DOCUMENTS 511,254 A * 12/1893 Smith ...................... B60M 1/30
191/20
2,478,747 A * 8/1949 Deal ........................ E02F 3/283
414/687
2,740,487 A 4/1956 Murty et al.
(Continued)

FOREIGN PATENT DOCUMENTS

DE 4315017 C1 9/1994
GB 1205092 A 9/1970
(Continued)

OTHER PUBLICATIONS

European Search Report for European Patent Application No. 22195404.3, completed Feb. 23, 2023, 2 pages.

*Primary Examiner* — Paul N Dickson
*Assistant Examiner* — Maxwell L Meshaka
(74) *Attorney, Agent, or Firm* — Withrow & Terranova, PLLC

(57) ABSTRACT

A truck comprising a chassis, further comprising a front bumper, a cabin comprising a front lid, and a lock. The front lid is operable between an open position and a closed position, and the lock is operable between an unlocking configuration of the front lid and a locking configuration in which the front lid is locked in the closed position. The cabin is pivotally mounted on the chassis and is tiltable between a horizontal position and an inclined position. The truck comprises a latching mechanism, operable between an unlocking configuration of the cabin and a locking configuration in which the cabin is locked in the horizontal position, and an opening mechanism, mechanically connecting the latching mechanism to the lock and automatically operating the lock from its locking configuration to its unlocking configuration when the latching mechanism is operated from its locking configuration to its unlocking configuration.

9 Claims, 3 Drawing Sheets

(56) References Cited

U.S. PATENT DOCUMENTS

| | | | | |
|---|---|---|---|---|
| 3,741,295 | A | * | 6/1973 | Murman ............... E21B 33/035 |
| | | | | 166/359 |
| 4,921,062 | A | * | 5/1990 | Marlowe ................ B62D 33/07 |
| | | | | 180/89.16 |
| 5,060,742 | A | | 10/1991 | Kuhlmann et al. |
| 5,209,316 | A | * | 5/1993 | Bauer .................... B62D 33/07 |
| | | | | 267/64.11 |
| 6,394,211 | B1 | | 5/2002 | Palenchar et al. |
| 11,208,158 | B1 | * | 12/2021 | Kim ....................... B62D 33/07 |
| 11,959,249 | B2 | * | 4/2024 | Selvam .................. E02F 9/166 |
| 2014/0159424 | A1 | | 6/2014 | Lee |
| 2021/0387682 | A1 | * | 12/2021 | Kim ....................... B62D 33/07 |
| 2023/0078475 | A1 | * | 3/2023 | Selvam .................. E02F 9/166 |
| | | | | 180/89.13 |
| 2024/0092432 | A1 | * | 3/2024 | Koogenahalli Sadashivaiah ........ |
| | | | | B62D 33/067 |

FOREIGN PATENT DOCUMENTS

| | | |
|---|---|---|
| JP | 2005162034 A | 6/2005 |
| WO | 2017048210 A1 | 3/2017 |

\* cited by examiner

TRUCK AND METHOD FOR TILTING THE CABIN OF SUCH A TRUCK

RELATED APPLICATIONS

The present application claims priority to European Patent Application No. 22195404.3, filed on Sep. 13, 2022, and entitled "TRUCK AND METHOD FOR TILTING THE CABIN OF SUCH A TRUCK," which is incorporated herein by reference in its entirety.

TECHNICAL FIELD

The disclosure relates generally to truck vehicles having a cabin able to tilt. In particular aspects, the disclosure relates to a truck and to a method for tilting the cabin of such a truck.

BACKGROUND

In the domain of heavy-duty vehicles comprising a cabin, such as trucks, it is known to mount the cabin on a chassis of the truck is a pivotable manner. The cabin can therefore be inclined, allowing access to certain mechanical components, such as the truck engine. Such truck comprises a latching mechanism to lock the cabin in a horizontal position. It is also known to provide a front lid at the front of the cabin, to allow access to various components such as engine oil tank or windscreen washer reservoir.

A common issue with trucks is that, when the cabin is inclined with the front lid in its closed position, the frond lid can collide with a front bumper of the chassis of the truck, causing damage to the front lid and/or to the bumper. Therefore, it is necessary to open the front lid before inclining the cabin.

Generally, it is the truck driver's responsibility to remember to open the front lid before tilting the cab. Hence, a reminder label is usually placed next to the latching mechanism. In addition, the cabin can be equipped with a sensor detecting if the front lid is open or not, and preventing the tilting of the cabin if the front lid is not open. In any case, an action of the driver is required to open the front lid. Alternatively, it is also known to use actuators dedicated to the opening of the front lid, but adding such actuators is expensive and complex.

SUMMARY

The invention aims to remove the need for the driver to manually open the front lid before tilting the cab with an inexpensive mechanism.

According to an aspect of the disclosure, the invention concerns a truck comprising:
- a chassis, comprising a front bumper,
- a cabin, comprising a front lid and a lock, the front lid being operable between an open position and a closed position, the lock being operable between an unlocking configuration in which the operation of the front lid is not prevented and a locking configuration in which the front lid is locked in the closed position, wherein the cabin is pivotally mounted on the chassis and is tiltable between a horizontal position and an inclined position,
- a latching mechanism, operable between an unlocking configuration in which the tilting of the cabin is not prevented and a locking configuration in which the cabin is locked in the horizontal position, and
- an opening mechanism, mechanically connecting the latching mechanism to the lock and automatically operating the lock from its locking configuration to its unlocking configuration when the latching mechanism is operated from its locking configuration to its unlocking configuration.

Hereby, a technical effect of the invention includes automatically opening the front lid of the cabin when the latching mechanism is operated, which results in an automatic opening of the front lid when the cabin is tilted, suppressing any risk of collision between the frond lid and the front bumper.

In certain examples, the opening mechanism comprises a flexible cable with a first end attached to the lock and a second end attached to the latching mechanism. Hereby, the opening mechanism is particularly inexpensive to produce and simple to implement.

In certain examples, the flexible cable is a Bowden cable. Hereby, the opening mechanism is more reliable, since the inner cable of the Bowden cable is protected inside of a housing.

In certain examples, the cabin comprises a spring exerting a spring force on the lock tending to operate the lock from its unlocking configuration to its locking configuration and the opening mechanism is operating the lock against the spring force. Hereby, the lock is spring-loaded, ensuring that the lock is maintained in its locking configuration when the opening of the front lid is not needed, reducing the risk of accidental opening.

In certain examples, the cabin comprises two locks, each lock being operable between an unlocking configuration in which the operation of the front lid is not prevented and a locking configuration in which the front lid is locked in the closed position, and the opening mechanism is mechanically connecting the latching mechanism to the two locks. Hereby, thanks to the use of two locks, the lid is more securely maintained in its closed position, and the opening mechanism is able to open both locks simultaneously when the opening of the front lid is required.

In certain examples, the latching mechanism comprises a latch, preventing the tilting of the cabin when the latching mechanism is in its locking configuration, and a hydraulic cylinder operating the latch, and the opening mechanism is mechanically connected to the latch. Hereby, the opening of the front lid by the opening mechanism is reliable since the opening mechanism directly uses the motion of the latch provided to allow or prevent the tilting of the cabin.

In certain examples, the cabin comprises at least one gas spring and, when the lock is in its unlocking configuration and when the cabin is tilted from its horizontal position to its inclined position, the gas spring pushes the front lid from its closed position to its open position. Hereby, when the lock is unlocked, the opening of the front lid is forced by the gas spring and is therefore more reliable.

According to another aspect of the disclosure, the invention concerns a method for tilting the cabin of a truck as described here above, the method comprising:
- a cabin unlocking step, during which the latching mechanism is operated from its locking configuration to its unlocking configuration to unlock the cabin;
- a front lid unlocking step, during which the opening mechanism operates the lock from its locking configuration to its unlocking configuration, wherein the front lid unlocking step is automatically induced by the cabin unlocking step;
- a cabin tilting step, during which the cabin is tilted from its horizontal position to its inclined position; and a front lid opening step, during which the front lid is opened, wherein the front lid opening step is performed automatically simultaneously with the cabin tilting step.

Hereby, a technical effect of the invention includes automatically unlocking the lock when the latching mechanism is operated and automatically opening the front lid when the cabin is tilted, suppressing any risk of collision between the frond lid and the front bumper.

In certain examples, when the cabin comprises at least one gas spring and, when the lock is in its unlocking configuration and when the cabin is tilted from its horizontal position to its inclined position, the gas spring pushes the front lid from its closed position to its open position, then during the front lid opening step, the front lid is opened due to the force exerted by the gas spring on the front lid when an inclination angle of the cabin is greater than 0°, preferably greater than 5°.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
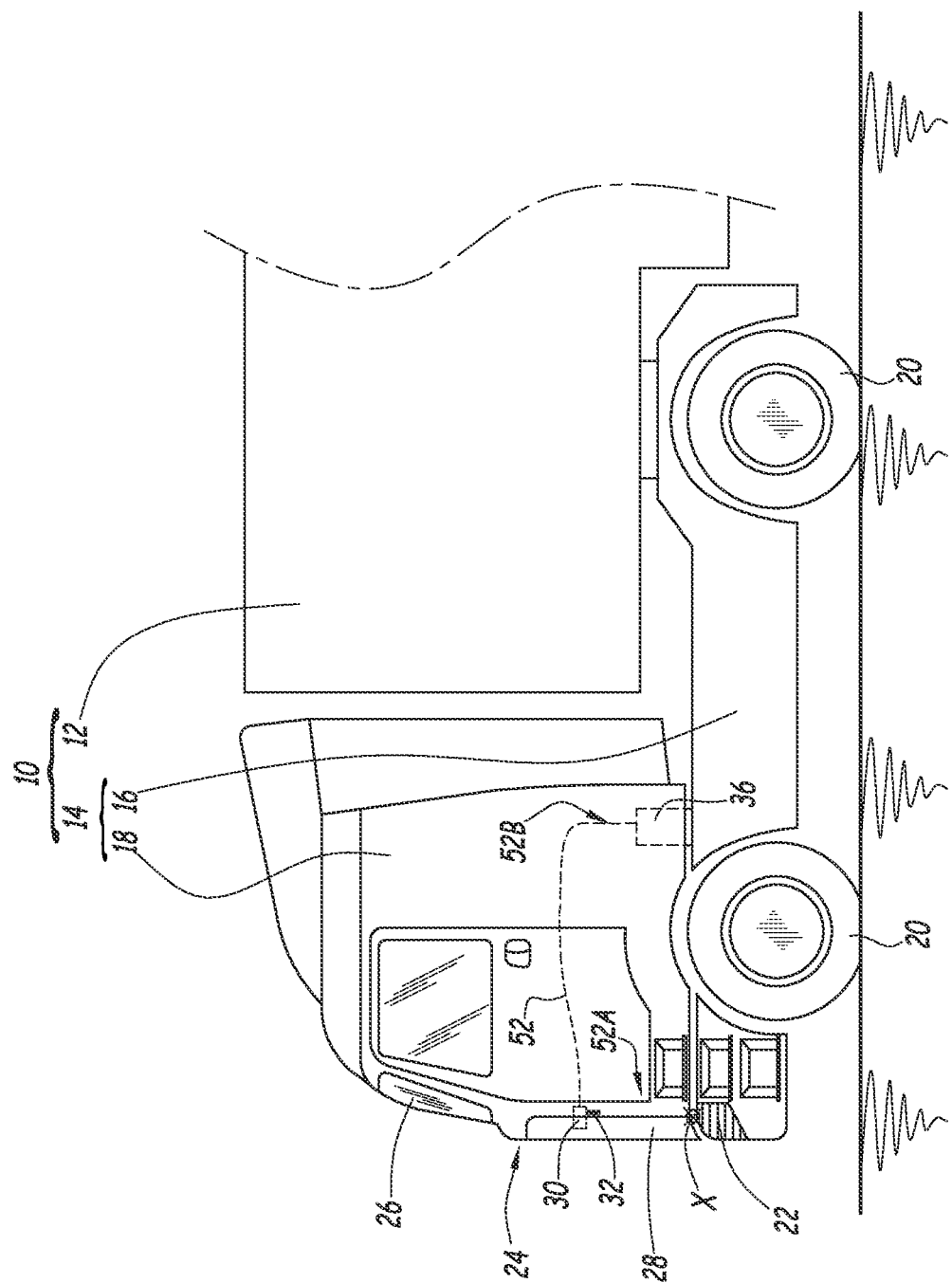
FIG. 1 is a side partial view of a truck according to the invention, the truck comprising a cabin in a horizontal position.
Figure 2:
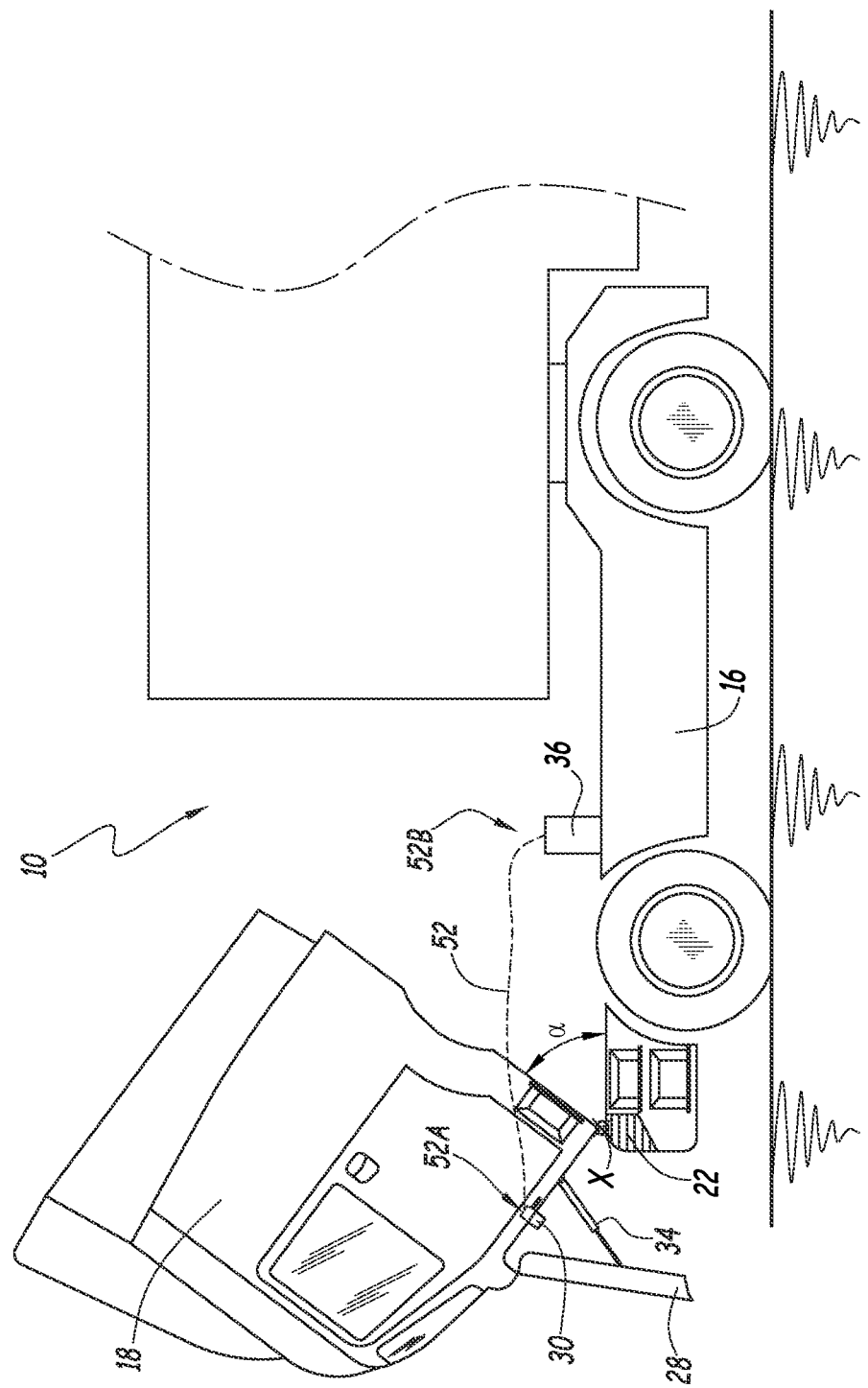
FIG. 2 is a view similar to FIG. 1, with the cabin in an inclined position.

An exemplary semi-trailer truck 10 is visible in FIGS. 1 and 2. The semi-trailer truck is referred to as a "truck" in the following description. The truck 10 comprises a semi-trailer 12 and a tractor unit 14 comprising a chassis 16 and a cabin 18. On FIGS. 1 and 2, the semi-trailer 12 is only partly shown.

The truck 10 also comprises an engine, not shown, mounted on the chassis 16 and located at least partly under the cabin 18.

The chassis 16 is provided with wheels 20, in the example four wheels 20 supported by two axles, and a front bumper 22, located at the front of the truck 10.

The cabin 18 comprises a front face 24, a windscreen 26 and a front lid 28. The windscreen 26 and the front lid 28 are located on the front face 24.

The front lid 28 is operable between a closed position, shown in FIG. 1, and an open position, shown in FIG. 2. When the truck 10 is in use, the front lid 28 is in the closed position. Opening the front lid 28 allows accessing various components of the truck 10, such as components of the engine, for example the engine oil tank, or the windscreen washer reservoir. In other words, the front lid 28 is usually opened for maintenance operations.

The cabin 18 also comprises a lock 30, which is operable between an unlocking configuration in which the operation of the front lid 28 is not prevented, that is in which the front lid is freely movable between the closed and open positions, and a locking configuration in which the front lid is locked in the closed position. Thus, in FIG. 1, the lock 30 is in its locking configuration, and, in FIG. 2, the lock is in its unlocking configuration. In the Figures, the lock 30 is shown schematically.

The lock 30 is operable by a user of the truck 10, either manually or by a control system, to allow the user to open the front lid 28.

Preferably, the lock 30 is spring-loaded, so that the lock automatically returns to its locking configuration when no other force is applied. In other words, the cabin 18 comprises a spring 32 exerting a spring force on the lock 30 tending to operate the lock from its unlocking configuration to its locking configuration.

The lock 30 can be of any type, such as, for example, a latch operated via spring or a cable.

Advantageously, the cabin 18 comprises at least one gas spring 34, preferably two gas springs 34. Each gas spring 34 is fixed on one extremity thereof to the front lid 28 and on the other extremity thereof to a structure of the cabin 18. The gas springs 34 are exerting a force on the front lid 28, relative to the structure of the cabin, which tends to push the front lid from its closed position to its open position when the lock 30 is in its unlocking configuration. Furthermore, the force exerted by the gas springs 34 on the front lid 28 tends to maintain the front lid in its open position.

The cabin 18 is pivotally mounted on the chassis 16 and is operable between a horizontal position, shown in FIG. 1, and an inclined position, or tilted position, shown in FIG. 2. An inclination angle of the cabin 18 is noted a. The inclination angle α is equal to 0° when the cabin 18 is in its horizontal position and is greater than 0° when the cabin is inclined, or tilted. In the example of FIG. 2, the inclination angle α is equal to 60°. In practice, the inclination angle α can take any value between 0° and 64°.

The truck 10 comprises a tilting system, not shown, for tilting the cabin 18. The tilting system comprises, for example, an actuator, such as a hydraulic cylinder, which is attached to the cabin 18 on the one hand and to the chassis 16 on the other hand, and which is able to tilt the cab. In practice, the cabin 18 is tilting around an axis X, which is horizontal and located at the front of the cabin, close to the front bumper 22 of the chassis 16.

Tilting the cabin 18 allows access to various components of the truck 10, such as the engine. In other words, tilting the cabin 18 is useful for maintenance operation of the truck. When the truck 10 is in use, i.e., when the truck is being driven, the cabin 18 is in its horizontal position.

The truck 10 comprises a latching mechanism 36, to secure and lock the horizontal position of the cabin 18. In practice, the latching mechanism 36 is located at the rear of the cabin 18 and securely connects the cabin to the chassis 16 to prevent any tilting of the cabin.

The latching mechanism 36 is operable between an unlocking configuration in which the operation of the cabin 18 is not prevented, that is in which the tilting system can tilt the cabin between its horizontal and inclined positions, and a locking configuration in which the cabin is locked in the horizontal position.

The latching mechanism 36 is either automatically operated by the tilting system, when the tilting system is activated by the user of the truck 10, or manually operated by the user of the truck 10 prior to activation of the tilting system.

Figure 3:
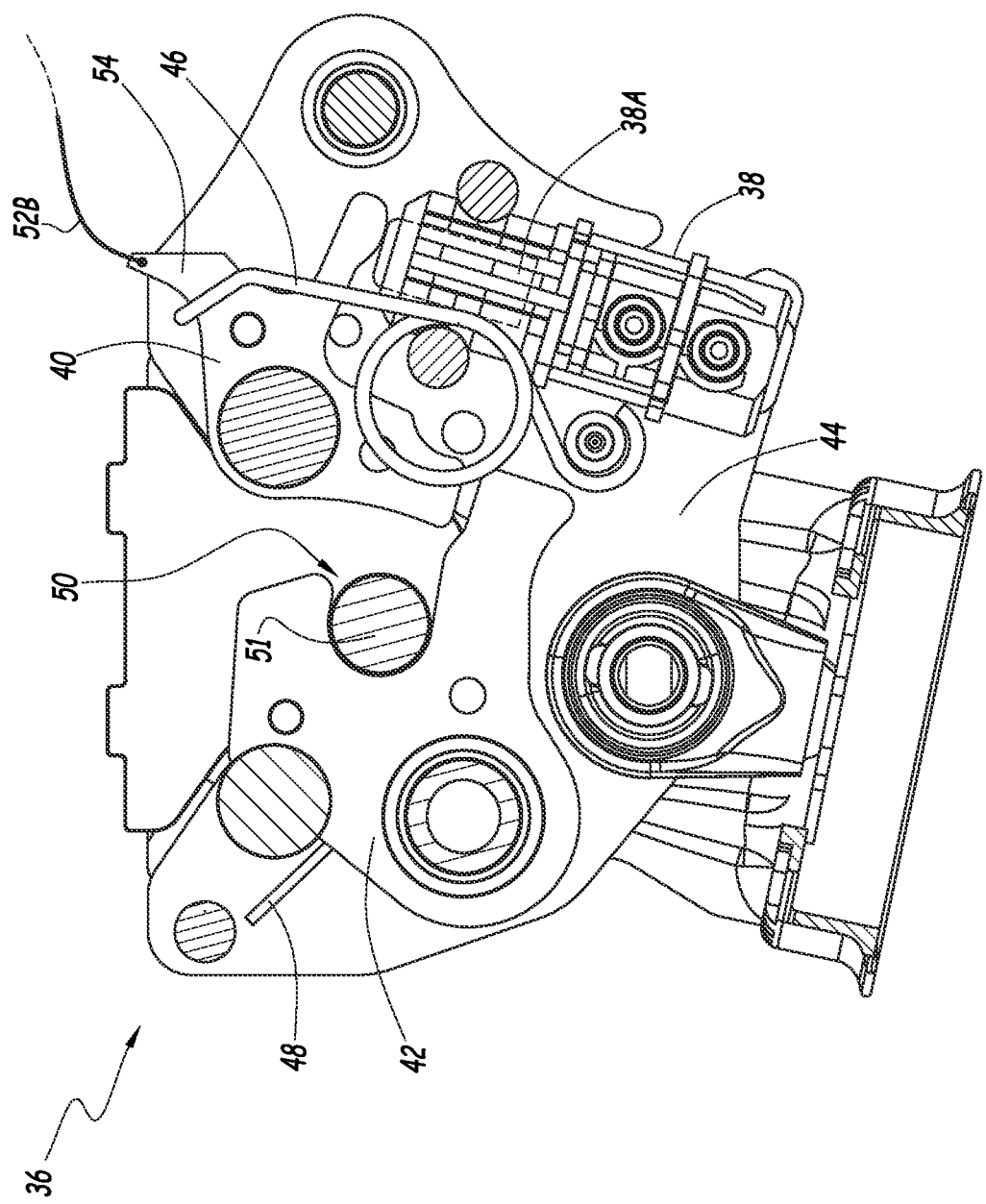
FIG. 3 is a cross-sectional view of a latching mechanism of the truck of FIGS. 1 and 2.

A preferred embodiment of the latching mechanism 36 is shown in detail in FIG. 3.

In the example, the latching mechanism 36 comprises a hydraulic cylinder 38, a first latch 40, a second latch 42 and a frame 44. The frame 44 is mounted on the chassis 16.

The first latch 40 is pivotally mounted on the frame 44 and is rotatable between a lock position and an unlock position. The latching mechanism 36 comprises a first spring 46, exerting a force on the first latch 40 relative to the frame 44 which tends to rotate the first latch from its unlock position to its lock position.

The second latch 42 is pivotally mounted on the frame 44 and is rotatable between a lock position and an unlock position. The latching mechanism 36 comprises a second spring 48, exerting a force on the second latch 42 relative to the frame 44 which tends to rotate the second latch from its lock position to its unlock position.

The first and second latches 40, 42 are shown in their lock position in FIG. 3. When the first and second latches are in their lock position, the second latch 42 is in abutment against the first latch, preventing the rotation of the second latch from its lock position to its unlock position. In other words, the lock position of the first and second latches are resting position, or stable position, of the first and second latches.

The second latch 42 provides a retaining slot 50, which cooperates with a locking shaft 51 of the cabin 18, or a striker, to prevent the cabin from tilting. In practice, when the second latch is in its lock position, the locking shaft 51 of the cabin is located in the retaining slot 50 and the shape of the second latch 42 prevents any movement of the locking shaft relative to the frame 44, therefore preventing any tilting of the cabin. When the second latch 42 is in its unlock position, the movement of the locking shaft is not prevented by the second latch, allowing for the cabin to be tilted by the tilting system.

The hydraulic cylinder 38 is operable between a rest position, shown in FIG. 3, and an activated position in which a rod 38A of the hydraulic cylinder extends towards the first latch 40.

When the hydraulic cylinder 38 is operated from its rest position to its activated position, the rod pushes onto the first latch 40 and exerts a force onto the first latch which rotates the first latch from its lock position to its unlock position against the force exerted by the first spring 46. Moreover, after the first latch 40 has been rotated from its lock position to its unlock position by the hydraulic cylinder, the second latch 42 is no longer in abutment against the first latch and the force exerted by the second spring 48 onto the second latch 42 rotates the second latch from its lock position to its unlock position.

In other words, when the hydraulic cylinder 38 is in its activated position, the latching mechanism 36 is in its unlocking configuration and the cabin 18 can be tilted by the tilting system.

To improve the aerodynamic properties of the truck 10, when the cabin 18 is in its horizontal position, the front lid 28 of the cabin is close to the front bumper 22 of the chassis 16, to minimize the gap between the front lid and the front bumper, thus reducing the turbulence between the front lid and the front bumper.

Whatever the reason why the gap between the front lid 28 and the front bumper 22 is reduced, this reduced gap implies that the front lid 28 must be open to tilt the cabin 18. Otherwise, during the tilting of the cabin, the front lid would interfere with the front bumper, leading to physical damage to the front lid and/or to the front bumper.

In a particularly advantageous way, the truck 10 comprises an opening mechanism 52 mechanically connecting the latching mechanism 36 to the lock 30 and automatically operating the lock 30 from its locking configuration to its unlocking configuration when the latching mechanism 36 is operated from its locking configuration to its unlocking configuration. In other words, the lock 30 is also operable by the opening mechanism 52, and thanks to the opening mechanism, the lock 30 is automatically opened when the latching mechanism 36 is operated.

Thus, thanks to the opening mechanism 52, there is no need for the user of the truck 10 to open the lock 30 prior to activation of the tilting system. As a result, the front lid 28 is always open before the cabin 18 is tilted and there is no risk to damage the front lid and the front bumper 22 when the cabin is tilted.

In practice, in the example, the opening mechanism 52 is a flexible cable, with a first end 52A attached to the lock 30 and a second end 52B attached to the latching mechanism 36. Here, the second end 52B of the flexible cable 52 is attached to the first latch 40 of the latching mechanism 36, more precisely to a protrusion 54 of the first latch.

When the latching mechanism 36 is operated from its locking configuration to its unlocking configuration, the rotation of the first latch 40 pulls on the flexible cable 52, and consequently the flexible cable pulls on the lock 30 against the force exerted by the spring 32, thus operating the lock from its locking configuration to its unlocking configuration.

Preferably, the flexible cable 52 is a Bowden cable, that is, a flexible cable comprising an inner cable and a hollow and flexible housing. The inner cable is located inside the housing and its extremities are fixed respectively to the lock 30 and to the protrusion 54 of the first latch 40. When the flexible cable 52 is actuated, for example when the first latch 40 pulls on it, the inner cable slides inside of the housing. In practice, the housing is fixed to the truck 10 and prevents unwanted movements of the flexible cable 52 while protecting the inner cable. The use of a Bowden cable is particularly advantageous, since such cables are inexpensive, easy to install and reliable.

Is now described a method for tilting the cabin 18 of the truck 10.

In a first step, the latching mechanism 36 is operated from its locking configuration to its unlocking configuration. At the end of the first step, the cabin 18 is unlocked and can therefore be tilted by the tilting system. The first step is thus a cabin unlocking step.

In a second step, the latching mechanism 36 operates the flexible cable 52, which in turn operates the lock 30 from its locking configuration to its unlocking configuration. In other words, in the second step, the lock 30 is unlocked thanks to the mechanical connection between the lock and the latching mechanism. The second step is thus a front lid unlocking step. Moreover, the second step is automatically induced by the movement of the first latch 40, through the flexible cable 52. In other words, the second step is performed automatically immediately after the first step, or even simultaneously with the first step.

In a third step, the tilting system of the truck 10 is activated to operate the cabin 18 from its horizontal position to its inclined position, that is, to increase the inclination angle α of the cabin 18. During the third step, the inclination angle α is progressively increased until a desired inclination angle is reached, for example α=60°. The third step is thus a cabin tilting step.

In a fourth step, the front lid 28 is opened, due to the force exerted by the gas spring s 34. The fourth step is performed automatically simultaneously with the third step, as soon as the tilting of the cabin 18 starts. Preferably, the force exerted by the gas springs 34 on the front lid 28 is not sufficient to open the front lid when the inclination angle α is equal to 0°, so that the opening of the front lid 28 only occurs when the cabin started tilting. In practice, the opening of the front lid 28 is helped by the force of gravity exerting a force on the front lid when the inclination angle α of the cabin 18 is greater than 0°, which is added to that exerted by the gas springs 34. In other words, due to the combined action of the gas springs 34 and of the gravity, the front lid 28 automatically opens when the inclination angle α of the cabin 18 is greater than 0°, for example greater than 5°. The fourth step is thus a front lid opening step.

When the latching mechanism 36 is automatically operated by the tilting system, the first step is started when the user of the truck 10 activates the tilting system. In other words, the first step is automatically started when the tilting system is activated. Therefore, the only action required by the user to open the front lid 28 and to tilt the cabin 18 is to activate the tilting system, the four steps described here above being automatically performed afterwards.

When the latching mechanism 36 is manually operated by the user of the truck 10, an action of the user of the truck is required to perform the first and third step described here above, while the second and fourth step are automatically performed.

In any case, the unlocking and opening of the front lid 28 is automatically performed when the cabin 18 is tilted, which is particularly advantageous since no action of the user of the truck 10 is required to open the front lid.

In the example, only one lock 30 is shown. As an alternative, not shown, the cabin 18 comprises more than one lock, for example, two locks, each lock being operable between an unlocking configuration in which the operation of the front lid 28 is not prevented and a locking configuration in which the front lid is locked in the closed position. In other words, for the front lid 28 to be opened, the two locks have to be in their unlocking configuration simultaneously.

As an alternative, not shown, the second extremity 52B of the flexible cable 52 is not attached to the first latch 40, but to the second latch 42, or to the hydraulic cylinder 38, or to any other part of the latching mechanism 36 which is moving when the latching mechanism is activated.

As an alternative, not shown, the latching mechanism 36 comprises only one of the two latches 40, 42, this latch being activated by the hydraulic cylinder 38 and providing the retaining slot 50. In this variant, the second extremity 52B of the flexible cable 52 is attached to the latch of the latching mechanism 36.

As an alternative, not shown, the latching mechanism 36 is of any different kind of mechanism susceptible to be used to lock the horizontal position of the cabin 18.

In the example, the word "truck" refers to a semi-trailer truck. Although the disclosure is described with respect to a semi-trailer truck, the disclosure is not restricted to any particular vehicle and the word "truck" can refer to any particular vehicle comprising a chassis and a cabin comprising a front lid and able to tilt relative to the chassis, such as, for example, construction equipment.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A truck comprising:
a chassis comprising a front bumper;
a cabin comprising a front lid and a lock, the front lid being operable between an open position and a closed position, the lock being operable between an unlocking configuration in which the operation of the front lid is not prevented and a locking configuration in which the front lid is locked in the closed position, wherein the cabin is pivotally mounted on the chassis and is tiltable between a horizontal position and an inclined position;
a latching mechanism, operable between an unlocking configuration in which the tilting of the cabin is not prevented and a locking configuration in which the cabin is locked in the horizontal position; and an opening mechanism, mechanically connecting the latching mechanism to the lock and automatically operating the lock from its locking configuration to its unlocking configuration when the latching mechanism is operated from its locking configuration to its unlocking configuration.

2. The truck of claim 1, wherein the opening mechanism comprises a flexible cable with a first end attached to the lock and a second end attached to the latching mechanism.

3. The truck of claim 2, wherein the flexible cable is a Bowden cable.

4. The truck of claim 1, wherein the cabin comprises a spring exerting a spring force on the lock tending to operate the lock from its unlocking configuration to its locking configuration and wherein the opening mechanism is operating the lock against the spring force.

5. The truck of claim 1, wherein the cabin comprises two locks, each lock being operable between an unlocking configuration in which the operation of the front lid is not prevented and a locking configuration in which the front lid is locked in the closed position, and wherein the opening mechanism is mechanically connecting the latching mechanism to the two locks.

6. The truck of claim 1, wherein the latching mechanism comprises a latch, preventing the tilting of the cabin when the latching mechanism is in its locking configuration, and a hydraulic cylinder operating the latch, and wherein the opening mechanism is mechanically connected to the latch.

7. The truck of claim 1, wherein the cabin comprises at least one gas spring and wherein, when the lock is in its unlocking configuration and when the cabin is tilted from its horizontal position to its inclined position, the gas spring pushes the front lid from its closed position to its open position.

8. A method for tilting the cabin of the truck of claim 1, the method comprising:

a cabin unlocking step, during which the latching mechanism is operated from its locking configuration to its unlocking configuration to unlock the cabin;

a front lid unlocking step, during which the opening mechanism operates the lock from its locking configuration to its unlocking configuration, wherein the front lid unlocking step is automatically induced by the cabin unlocking step;

a cabin tilting step, during which the cabin is tilted from its horizontal position to its inclined position; and a front lid opening step, during which the front lid is opened, wherein the front lid opening step is performed automatically simultaneously with the cabin tilting step.

9. The method of claim 8, wherein: the cabin comprises at least one gas spring and wherein, when the lock is in its unlocking configuration and when the cabin is tilted from its horizontal position to its inclined position, the gas spring pushes the front lid from its closed position to its open position; and wherein, during the front lid opening step, the front lid is opened due to the force exerted by the gas spring on the front lid when an inclination angle ($\alpha$) of the cabin is greater than 0°.

\* \* \* \* \*